E. E. HALL.
CEILING AND FLOOR CONSTRUCTION.
APPLICATION FILED FEB. 23, 1918. RENEWED AUG. 12, 1921.
1,417,056.
Patented May 23, 1922.
6 SHEETS—SHEET 1.
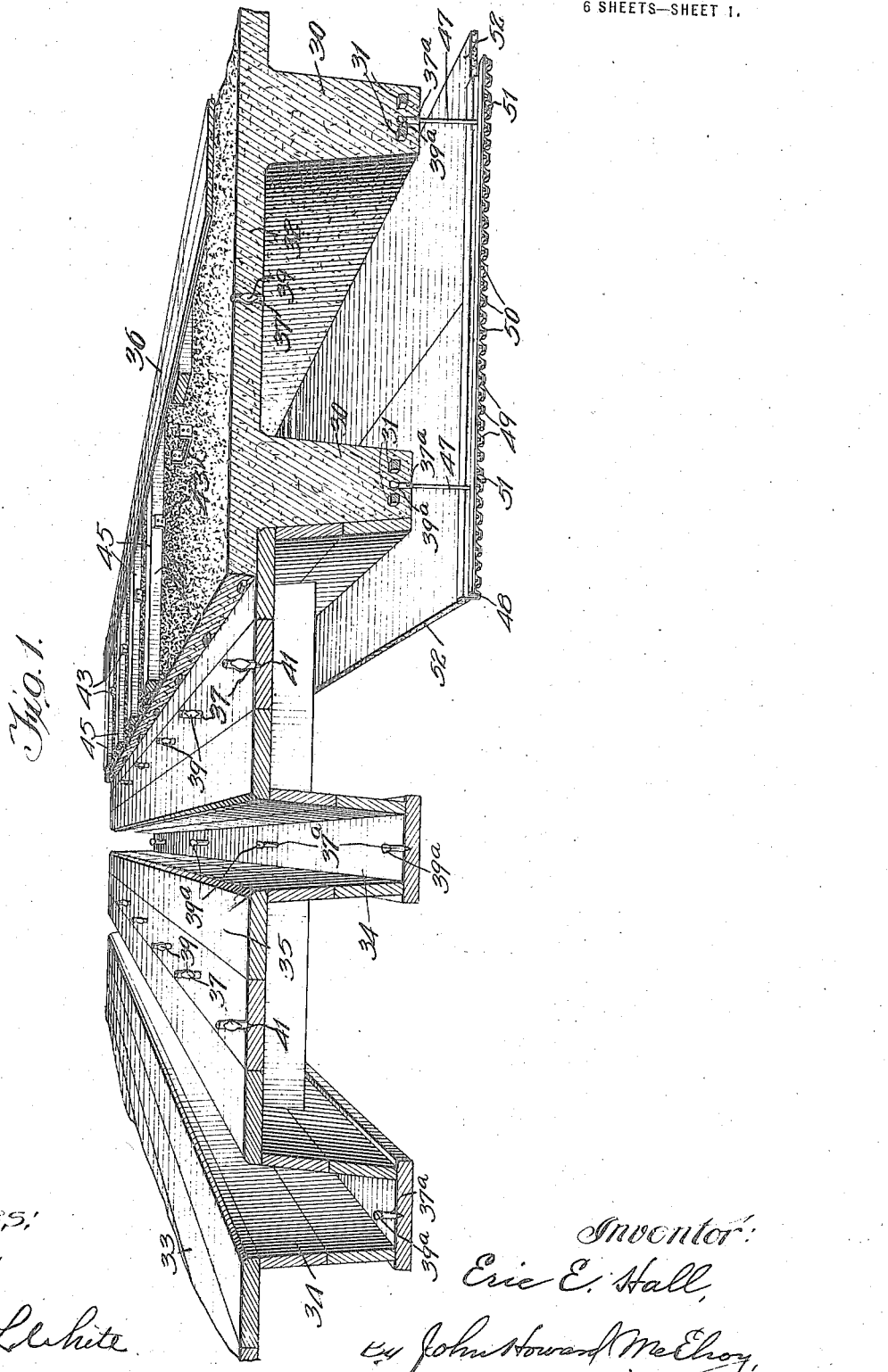

E. E. HALL.
CEILING AND FLOOR CONSTRUCTION.
APPLICATION FILED FEB. 23, 1918. RENEWED AUG. 12, 1921.
1,417,056.
Patented May 23, 1922.
6 SHEETS—SHEET 2.
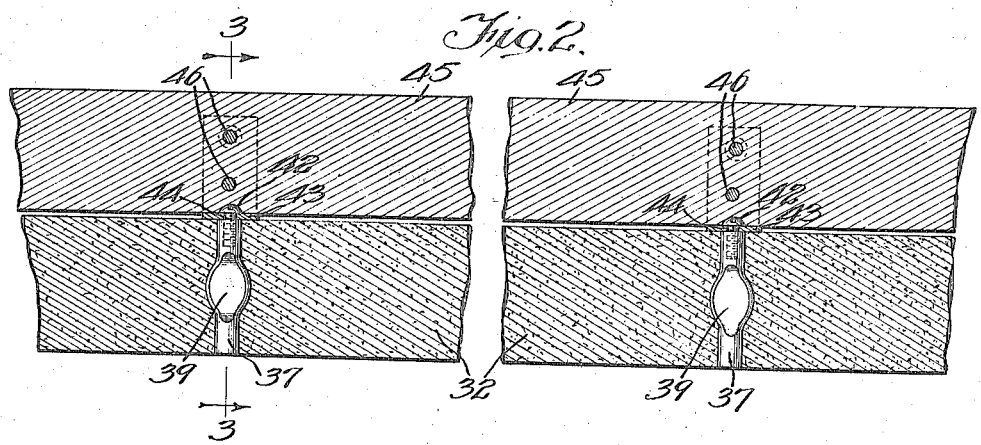
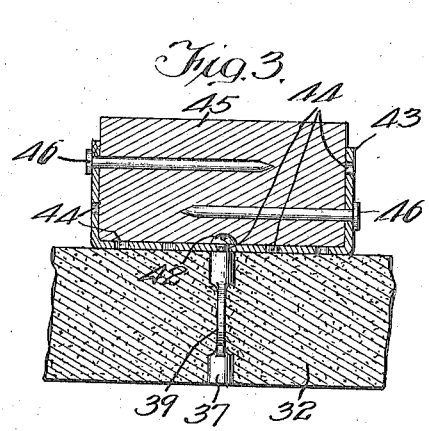
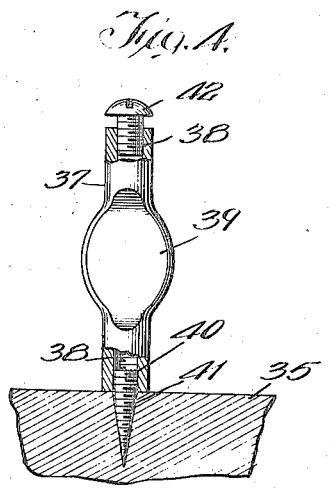
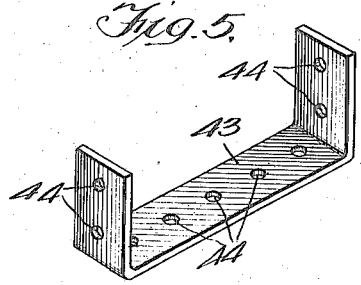
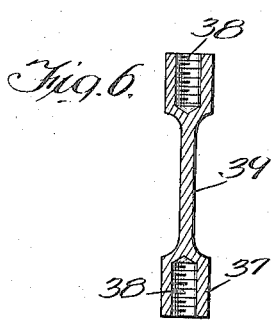
Witnesses:
W. J. Kilroy
Harry R. L. White
Inventor:
Eric E. Hall,
By John Howard McElroy,
his Atty.

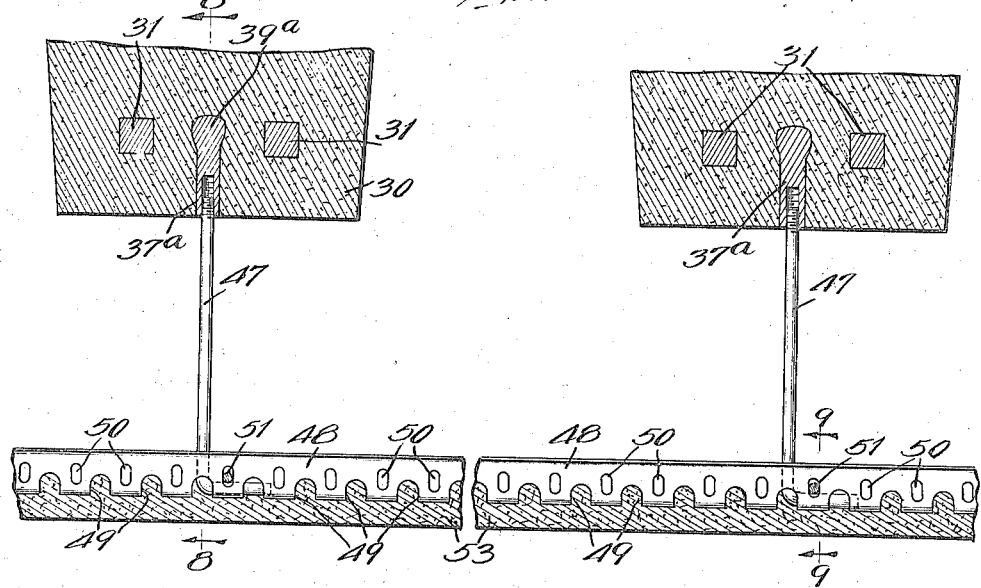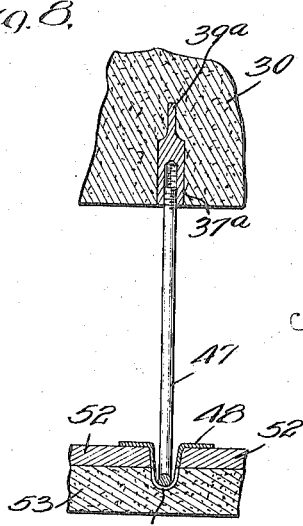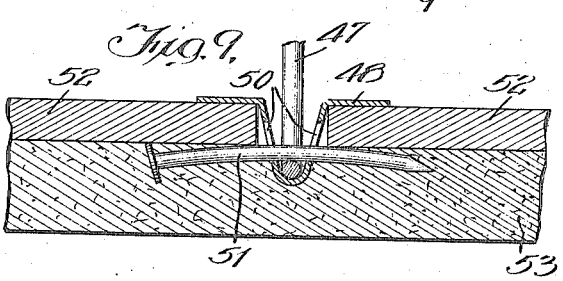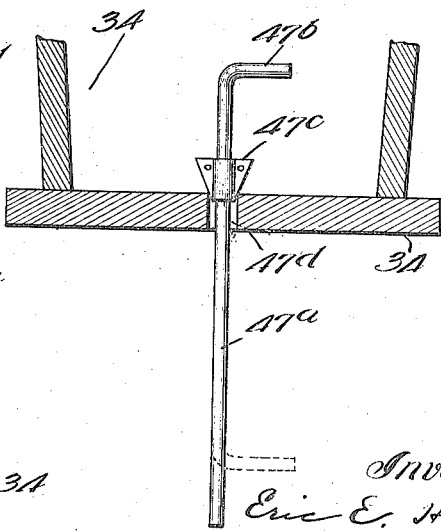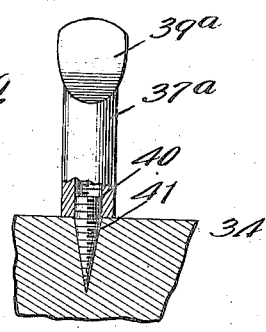

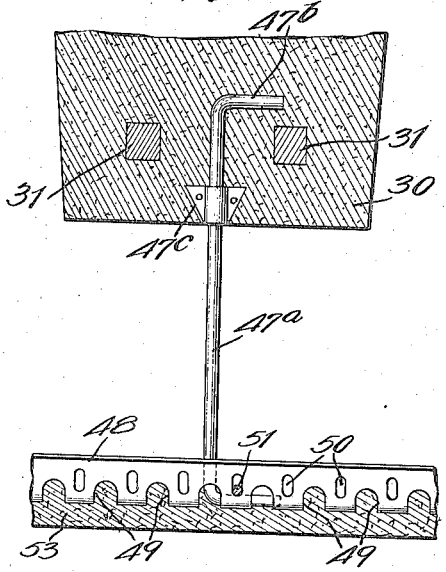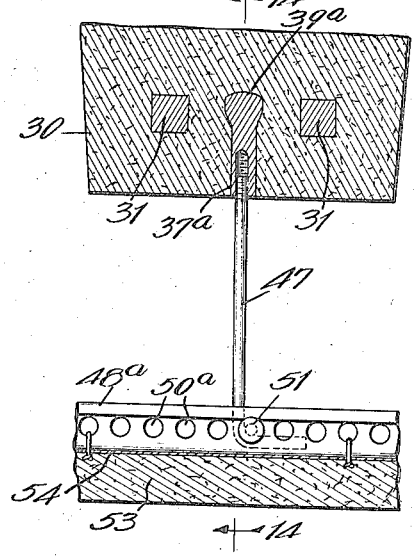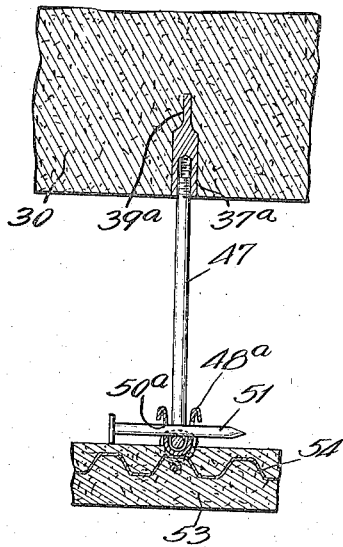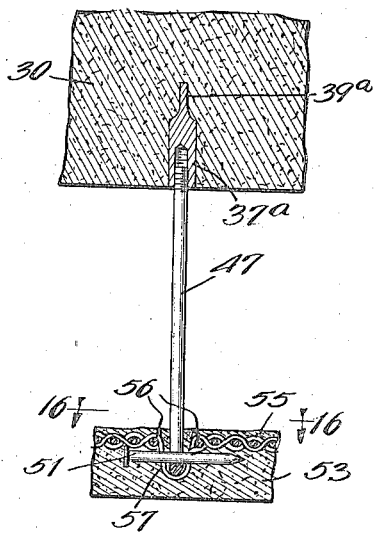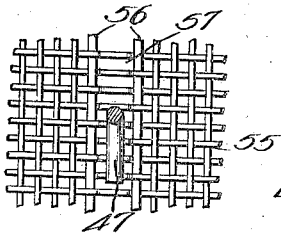

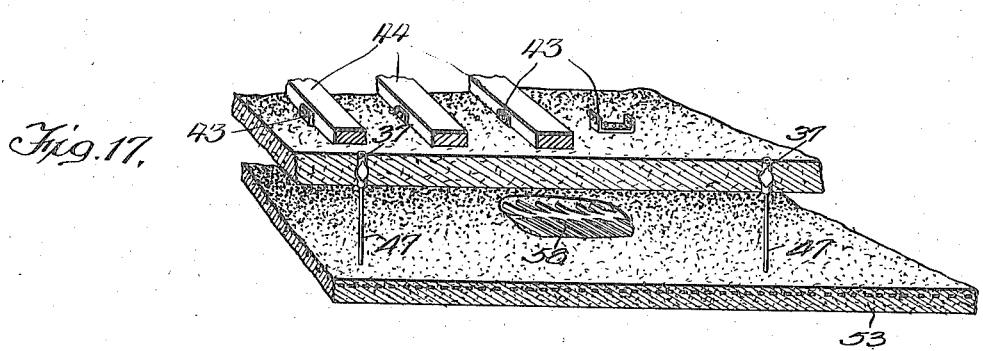
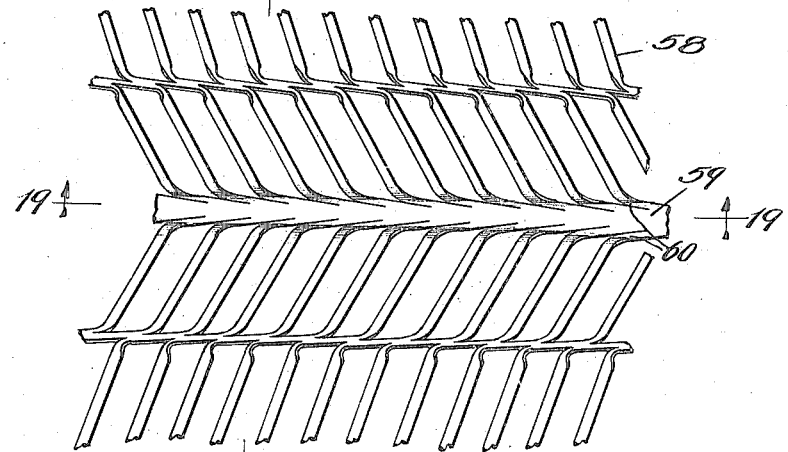
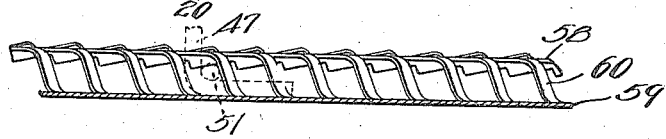

E. E. HALL.
CEILING AND FLOOR CONSTRUCTION.
APPLICATION FILED FEB. 23, 1918. RENEWED AUG. 12, 1921.
1,417,056.
Patented May 23, 1922.
6 SHEETS—SHEET 6.
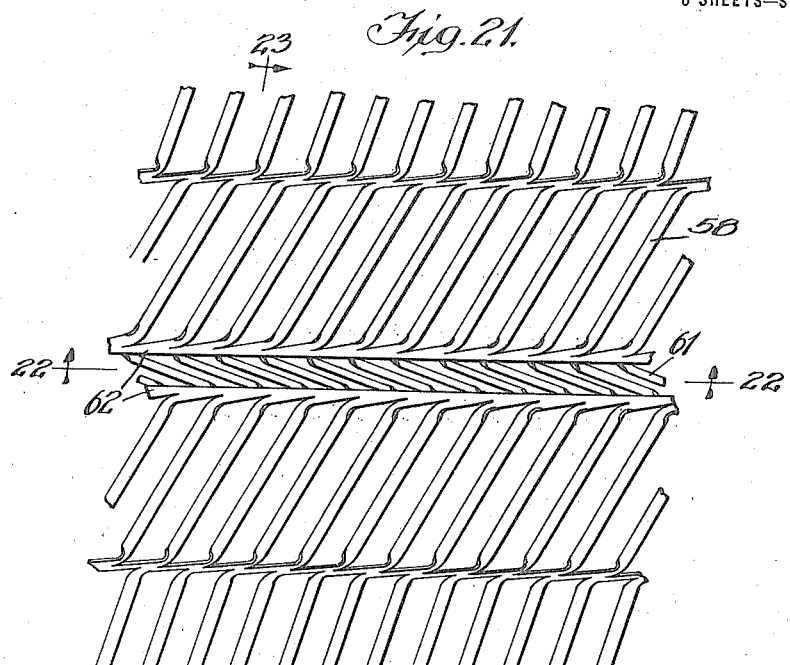
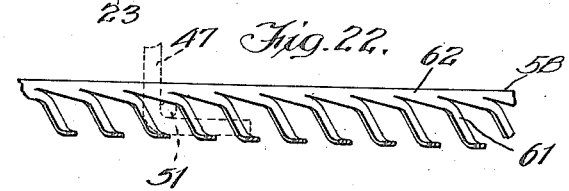
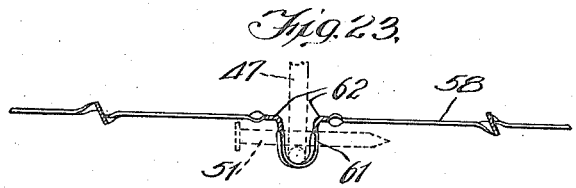

UNITED STATES PATENT OFFICE.

ERIC E. HALL, OF CHICAGO, ILLINOIS.

CEILING AND FLOOR CONSTRUCTION.

1,417,056.           Specification of Letters Patent.     Patented May 23, 1922.

Application filed February 23, 1918, Serial No. 218,613. Renewed August 12, 1921. Serial No. 491,875.

*To all whom it may concern:*

Be it known that I, ERIC E. HALL, a citizen of the United States, and a resident of Chicago, in the county of Cook and State of Illinois, have invented certain new and useful Improvements in Ceiling and Floor Constructions, of which the following is a full, clear, and exact specification.

My invention is concerned with ceiling and floor construction, and is designed to produce such a construction that can be quickly and cheaply constructed, and which nevertheless will be accurate and durable.

To illustrate my invention, I have annexed hereto six sheets of drawings in which the same reference characters are used to designate identical parts in all the figures, of which—

Fig. 1 is a perspective view of a ceiling and floor construction embodying my invention in various stages of completion to illustrate the method by which it is constructed;

Fig. 2 is a section on an enlarged scale showing the floor construction;

Fig. 3 is a section on the line 3—3 of Fig. 2;

Fig. 4 is a side elevation of a novel anchor employed in carrying out my invention with a portion of its top and bottom broken away;

Fig. 5 is a perspective view of a connecting piece;

Fig. 6 is a central vertical longitudinal section of the anchor seen in Fig. 4;

Fig. 7 is a section on an enlarged scale showing the suspended ceiling construction;

Fig. 8 is a section on the line 8—8 of Fig. 7;

Fig. 9 is an enlarged section as seen on the line 9—9 of Fig. 7;

Fig. 10 is an enlarged elevation of the anchor shown in Figs. 7 and 8 but with the lower portion broken away;

Fig. 11 is a view showing a possible modification before the concrete is poured;

Fig. 12 is a view of the same construction after the ceiling is completed;

Fig. 13 is a detail similar to Fig. 7 but showing a modified form of ceiling construction;

Fig. 14 is a view in section on the line 14—14 of Fig. 13;

Fig. 15 is a view of a modified ceiling construction in which a mesh wire reinforcement is employed;

Fig. 16 is a section on the line 16—16 of Fig. 15;

Fig. 17 is a perspective view of a suspended ceiling construction employing a reinforcing of expanded metal;

Fig. 18 is a top plan view of a portion of a novel expanded metal sheet;

Fig. 19 is a detail of the same in cross section on line 19—19 of Fig. 18;

Fig. 20 is likewise a cross section on the line 20—20 of Fig. 18;

Fig. 21 is a plan view of still another novel form of expanded metal construction;

Fig. 22 is a longitudinal section on the line 22—22 of Fig. 21; and

Fig. 23 is a detail in cross section on the line 23—23 of Fig. 21.

My invention is concerned with a novel suspended ceiling and floor construction for use in buildings employing concrete floors, and in such buildings the floor may be formed of transverse parallel beams 30 of concrete, spaced apart a suitable distance, and ordinarily provided with reinforcing rods 31 extending through the lengths of the beams. Formed integrally with these beams 30 are the thinner connecting flooring 32, and in the formation of such beams and flooring, it is customary to build up the false work 33 which is provided with the channels 34 to form the beams and the surfaces 35 on which the body of the floor rests. After this false work has been built up, the reinforcing rods 31 are laid and the concrete poured in and finished off in the customary manner, and it will be understood that the construction of the beams and concrete floors per se form no part of my present invention.

To conveniently and cheaply secure thereon the ordinary tongue and groove wooden flooring 36, I secure on the false work 33 preferably at the center of the portions 35 between the troughs 34 and the anchors 37, which, as best seen in Figs. 4 and 6, consist of cylindrical tops and bottoms having the internally threaded ends 38 connected by the flattened anchor portion 39, which portion it will be understood is provided so that the anchors cannot be withdrawn from the concrete when it is set. When these anchors are secured in place on the false work 33, they have special wood screws with machine screw threads 40 to take the place of the ordinary head screwed into the threaded lower ends, and the wood screw portions 41 in turn are screwed into the false work so that the anchors can be secured in place in the regular lines or rows shown in Fig. 1. It will be understood that these anchors are of the length corresponding to the thickness of the body of the floor, and when the concrete is being poured, the upper ends are closed by the screws 42 screwed into the threaded tops for this purpose. After the concrete flooring has hardened, and the wooden flooring is to be put in place, the screws 42 are removed and the angular connecting pieces 43, shown in Fig. 5, are placed on top of the flooring with one of their apertures 44 therein registering with the tops of the threaded apertures 38 and the screws 42 are again applied to secure the connecting pieces 43 in place. These connecting pieces are preferably cut from strips of sheet metal of the proper size and thickness to receive the floor sleepers 45 which are placed thereon and are thus supported substantially on the top of the concrete flooring 32. The ends of the connecting piece 43 are then turned up and the nails 46 are driven through some of the apertures 44 to secure the floor sleepers 45 in place, as will be readily understood. Once the floor sleepers 45 are secured in place, the tongue and groove flooring 36 can then be nailed thereon in the customary manner, and a thoroughly satisfactory flooring is thus produced, and it will also be understood that any deadening material that is desired can be interposed between the tongue and groove flooring 36 and the top of the flooring 32. It will of course be understood that when the false work 33 is removed, the screws 40 may be removed or clipped off, if desired.

For the basis of the support for the suspended ceiling, I employ similar anchors 37ª which, if they are to be inserted at the bottom of the beams 30, are preferably shaped as shown in Fig. 10, the upper cylindrical portion being omitted and the anchor portion 39 being shortened to the form 39ª, which is sufficient to embed the anchor in the concrete and also to be used for screwing the wood screw portion 41 into place in the false work 34 to position the anchors, and it will be understood that these anchors 37ª are also placed in rows, as clearly shown in Fig. 1. When the false work has been removed, the screws 40 are also removed and rods 47 having their upper ends screw-threaded and cut to the desired length are screwed into the bottoms of the anchors 37ª. If it is a flat slab flooring the anchors 37 shown in Figs. 4 and 6 may be employed so that the same anchors are used to hold the floor sleepers and suspend the ceiling, as shown in Fig. 17. The lower ends of these rods 47 are bent at right angles, and are adapted to fit into some form of a skeletonized metallic bar, one form 48 of which is shown in Figs. 7, 8 and 9, where it will be seen to consist of the horizontal side flanges connected by U- or V-shaped troughs. This trough portion is preferably provided with the large recesses 49 in the bottom thereof, which recesses are provided primarily to permit plaster to pass therethrough, and also with the smaller slightly elongated and staggered recesses 50, located at suitable intervals and designed primarily to have the wire nails 51, or some similar fastening member, passed therethrough and over the horizontal end of the rod 47, so that the skeletonized bar 48 is suitably supported from the ceiling. With this form of bar, I preferably construct the ceiling of layers of plaster-board 52, which plaster-board is well known in the art, and it will be understood that the edges of said plaster-board fit under the horizontal flanges of the rib, and that it is held in place by the nails 51, which will be passed through the apertures 50 in connection with each of the rods 47 and at as many other places as may be necessary to suitably support the plaster-board. After the plaster-board has been secured in place, a bottom coating of plaster 53 with any suitable finish on its under surface is applied, thus finishing the ceiling.

In Figs. 11 and 12, I have illustrated a possible substitute for the anchors 37ª and the rod 47 in a rod 47ª having its upper end 47ᵇ bent over and with sheet metal or other angular anchor pieces 47ᶜ riveted thereon and adapted to position the rod to suspend the ceiling at its proper height by their co-operation with apertures 47ᵈ bored in the false work 34. After the concrete has hardened the false work is easily removed without injuring the rod, the lower end of which can be bent up at right angles at the proper point, but this construction is somewhat inferior to the one employing the anchors 37ª and the threaded rod 47 inasmuch as it is not possible to secure the nicety of adjustment that is possible by screwing the rod 47 into or out of the anchor 37ª.

In Figs. 13 and 14 I have illustrated a construction like that shown in Figs. 7, 8 and 9 except that the skeletonized metallic bar 48ª has been modified in its design, and the single set of enlarged apertures 50ª have been substituted for the apertures 49 and 50 of the form shown in Fig. 7, and the flanges have been turned down. The same rods 47 are employed and the bars 48ª secured thereto by the same nails 51, but I have shown the ceiling here as formed by an ordinary expanded metal 54 wired at suitable intervals to the bars 48ª and having the plaster 53 placed thereon in the customary manner.

In Figs. 15 and 16, I show a modification in which the same hangers 37ª and threaded rods 47 are employed, but the reinforcement is formed by a wire mesh 55, which has the skeletonized bar preferably formed integrally therewith by introducing into the mesh at suitable intervals a pair of larger wires 56, and forming between said larger wires a channel 57 in the body of the mesh.

It will be obvious that the hangers can be secured to the troughs 57 of this mesh by the nails 51 in the customary manner, and that the plaster 53 can be applied thereto the same as to the expanded metal.

For the preferred construction, however, I prefer employing a special form of expanded metal, such for instance as the form shown in Figs. 18 to 23. In the form shown in Figs. 18 to 20, the body 58 of the expanded metal is provided with a skeletonized rib by forming therein a trough-like portion having the solid bottom 59 and the skeletonized sides 60, and it will be understood that the ends of the hangers can be secured in the troughs by the nails 51 in the same manner as in the other forms shown and when the expanded metal has been placed, the plaster 53 can be applied thereto as in the other forms shown. In Figs. 21 to 23, I have shown another special form of expanded metal in which the customary body portion 58 is provided with the skeletonized ribs formed by the depressed channel formed by the skeletonized portion 61 between the adjacent uncut portions 62 being depressed into the generally U-shaped form shown in Fig. 23, thus producing a skeletonized channel in which the horizontal ends of the rods 47 can be secured in the same manner as illustrated in connection with the other forms of my invention.

I have heretofore pointed out that with the construction shown, the height of the ceiling can be adjusted to a nicety, and it will be further apparent that if for any reason it is desired to produce ceilings of different heights, this can be readily done in any part of the building simply by changing the length of the rods 47. I have found by actual experience that this ceiling can be built at a very considerable saving in cost over any similar ceiling, and that it is just as good, if not better than the more expensive ones which it replaces.

While I have shown and described my invention as embodied in some of the forms which I at present consider best adapted to carrying out these purposes, it will be understood that it is capable of modifications, and that I do not desire to be limited in the interpretation of the following claims except as may be necessitated by the state of the prior art.

What I claim as new, and desire to secure by Letters Patent of the United States is:

1. In a concrete floor and suspended ceiling construction, the combination with a concrete floor, of plural parallel rows of separated anchor supports adapted to be secured on the forms so as to be supported thereby before the concrete is poured and to be completely embedded in the concrete and supported thereby when the form is removed, except their lower ends which are then exposed, depending rods individually secured in the bottoms of said supports, elongated metallic members beneath the rows of supports and secured to the lower ends of the rods, and sheets of plastic material connecting the members and supported thereby to form a suspended ceiling.

2. In a concrete floor and suspended ceiling construction, the combination with a concrete flooring, of plural parallel rows of separated anchor supports having internally threaded lower ends adapted to receive screws by which they may be secured on the forms so as to be supported thereby before the concrete is poured, said supports being completely embedded in the concrete and supported thereby when the form is removed, except their lower ends which are then exposed, depending rods having their upper ends individually screwed into said supports after the forms have been removed, elongated metallic members beneath the rows of supports and secured to the lower ends of the rods, and sheets of plastic material connecting the members and supported thereby to form a suspended ceiling.

3. In a floor and ceiling construction, the combination with a flooring, of plural parallel rows of separated anchor supports firmly embedded in the under side of the flooring, depending rods individually secured to said supports, perforated metallic troughs open at the top beneath the rows of supports into which the lower ends of the rods which are bent at right angles to the bodies thereof extend, nails passed through perforations in the troughs above the ends of the rods, and sheets of plastic material connecting the troughs and supported thereby to form a suspended ceiling.

4. In a floor and ceiling construction, the combination with a flooring, of plural parallel rows of separated anchor supports firmly embedded in the under side of the flooring and secured against an upward thrust, depending rods individually secured to said supports, sheets of expanded metal having skeletonized channels open at the top formed therein parallel to the rows of supports and in which the lower ends of the rods are secured to prevent upward movement of either the channels or rods, and plaster spread upon and forced through the under side of said expanded metal to form the ceiling.

5. In a concrete floor construction, the combination with a concrete floor, of plural parallel rows of separated anchor supports having internally threaded tops adapted to be secured on the forms so as to be supported thereby before the concrete is poured and to be completely embedded in the concrete and supported thereby when the form is removed, except their upper ends which are then exposed, said upper ends being flush with the upper side of the flooring, angular connecting pieces screwed to the tops of said anchor supports, wooden nailing strips secured to the connecting pieces, and flooring secured on the tops of the nailing strips, substantially as shown and described.

6. In a concrete floor and suspended ceiling construction, the combination with a concrete flooring, of plural parallel rows of separated anchor supports having internally threaded tops and bottoms adapted to be secured in the forms by screws co-operating with the threaded bottoms so as to be supported thereby before the concrete is poured and to be completely embedded in the concrete and supported thereby when the forms are removed, except their ends which are then exposed, angular connecting pieces screwed to the tops of said anchor supports, wooden nailing strips secured to the connecting pieces, flooring secured on the top of the nailing strips, depending rods having threaded upper ends individually screwed in the bottoms of said supports after the forms have been removed, elongated metallic members beneath the rows of supports and secured to the lower ends of the rods, and sheets of plastic material connecting the members and supported thereby to form a suspended ceiling.

7. In a concrete floor and suspended ceiling construction, the combination with a concrete floor, of plural parallel rows of separated anchor supports adapted to be secured on the forms so as to be supported thereby before the concrete is poured and to be completely embedded in the concrete and immovably supported thereby when the form is removed against upward thrust, except their lower ends which are then exposed, depending rods individually secured in the bottoms of said supports and rigid against upward thrusts, longitudinal metallic supporting members beneath the rows of supports to which the lower ends of the rods extend and to which they are secured and rigidly held against upward thrust, and sheets of plastic material connecting the supporting members and supported thereby to form a suspended ceiling.

In witness whereof, I have hereunto set my hand and affixed my seal, this 16th day of February, A. D. 1918.

ERIC E. HALL. [L. S.]

Witness:

JOHN HOWARD MCELROY.